US008086886B2

(12) United States Patent
Schmidt et al.

(10) Patent No.: US 8,086,886 B2
(45) Date of Patent: Dec. 27, 2011

(54) GROUP POWER MANAGEMENT OF NETWORK DEVICES

(75) Inventors: Brian K. Schmidt, Sunnyvale, CA (US); James G. Hanko, Redwood City, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 678 days.

(21) Appl. No.: 12/197,020

(22) Filed: Aug. 22, 2008

(65) Prior Publication Data

US 2009/0063878 A1    Mar. 5, 2009

Related U.S. Application Data

(60) Provisional application No. 60/969,547, filed on Aug. 31, 2007.

(51) Int. Cl.
G06F 1/26 (2006.01)
G06F 1/32 (2006.01)

(52) U.S. Cl. ........ 713/323; 713/300; 713/310; 713/320; 713/321; 713/322; 709/224

(58) Field of Classification Search .................. 713/300, 713/310, 320–324, 330, 340; 709/224
See application file for complete search history.

(56) References Cited

U.S. PATENT DOCUMENTS 6,047,378 A * 4/2000 Garrett et al. ................. 713/300
6,697,383 B1 2/2004 Li et al.
2005/0047356 A1 3/2005 Fujii et al.
2005/0123109 A1 6/2005 Yamagishi et al.
2005/0276237 A1 12/2005 Segal et al.
2006/0075269 A1* 4/2006 Liong et al. ................. 713/300
2006/0184813 A1* 8/2006 Bui ............................. 713/320
2007/0124440 A1* 5/2007 Maki ........................... 709/223

FOREIGN PATENT DOCUMENTS

EP    2188945    3/2011

OTHER PUBLICATIONS

"PCT ISR WO Mailed Nov. 12, 2008 for PCT/US2008/074517", (Nov. 12, 2008), Whole Document.
"IBM Technical Disclosure Bulletin", *IBM Corp.* New York, US, vol. 39, No. 12, XP000686013, ISSN: 0018-8689, (Dec. 1, 1996), 41-42.
Int'l Preliminary Report on Patentability for Int'l Application No. PCT/US2008/074517 mailed Mar. 11, 2010.
Certificate of Grant for European Patent No. 2188945, Mailed Mar. 23, 2011, 1 page.

* cited by examiner

*Primary Examiner* — Thomas Lee
*Assistant Examiner* — Fahmida Rahman
(74) *Attorney, Agent, or Firm* — Blakely Sokoloff Taylor & Zafman

(57) ABSTRACT

A method and apparatus for group power management of network devices. Some embodiments of an apparatus include a power management module, where the power management module is to transition the apparatus from a normal state to a low power state. The apparatus includes a wake module having a processor that remains active in the low power state, and a register to store a group address. The apparatus includes a network interface that is monitored by the processor in the low power state, where the processor detects a data packet identifying the group address at the network interface, and where the power management module returns the apparatus to the normal state upon detection of the data packet.

14 Claims, 7 Drawing Sheets

GROUP POWER MANAGEMENT OF NETWORK DEVICES

RELATED APPLICATIONS

This application is related to and claims priority to U.S. provisional patent application 60/969,547, filed Aug. 31, 2007.

TECHNICAL FIELD

Embodiments of the invention generally relate to the field of networks and, more particularly, to a method and apparatus for group power management of network devices.

BACKGROUND

A network may include the interconnection of multiple devices, such as personal electronic entertainment devices. In such a network, interconnected devices may share data, including the sharing of related streams of data. A local service network is an interconnection network on which a variety of user-level services wish to advertise their presence and establish communication without the need for managed network services (such as DHCP—Dynamic Host Configuration Protocol, DNS—Domain Name Service, Jini-Sun Microsystems networking technology) or explicit foreknowledge, such as services that do not have well-known addresses. In such operations, networks commonly use service discovery protocols so that devices can detect the presence of other devices and establish communication. For example, UPNP (Universal Plug and Play) can be used by a personal computer on an unmanaged home network to discover printers that are available on the network, thereby enabling an application to establish communication with such a device and print a document.

There are many discovery protocols in widespread use today. However, these protocols generally require the active participation of any device that wishes to be discovered. Reducing power consumption in electronic devices is a growing requirement, and idle devices typically enter reduced-power states (which may also be referred to as low-power modes, sleep states, slumber modes, standby modes, or other similar terminology) to conserve energy. When a device is in low-power mode, as much functionality and circuitry is disabled as possible. Network devices thus cease communication, thereby rendering them invisible to discovery protocols.

A means may be implemented to remotely awaken a device from reduced-power mode. Modern network devices typically provide such a feature, which may include Wake-on-LAN (WoL), which includes the transmission of a data packet, referred to as a "Magic Packet™", to awaken devices that have transitioned to a low power state. (See "Magic Packet Technology,", AMD, Publication 20213, November 1995) A process for waking devices on a network may commonly operate as follows: When a device enters low power mode, the device enables a simple state machine processor that passively monitors network traffic. When a wake signal or packet (such as a Magic Packet for WoL traffic) is observed, the state machine resumes power to the rest of the device and brings up the network for full communication. The wake signal may be formatted as a standard broadcast Ethernet frame that identifies the device to be awakened by its MAC (Media Access Control) address. This process provides a process to awaken an individual device via an explicit request.

However, the conventional technology is useful only when the address of the device to be awakened is known in advance such that the frame may be addressed to such device. In a service network, the addresses of services are generally unknown and may be continually changing, thus providing an anonymous group of devices that need to be awakened in the network.

SUMMARY OF THE INVENTION

A method and apparatus are provided for group power management of network devices.

In a first aspect of the invention, an apparatus includes a power management module, where the power management module is to transition the apparatus from a normal state to a low power state. The apparatus includes a wake module having a processor that remains active in the low power state, and a register to store a group address. The apparatus includes a network interface that is monitored by the processor in the low power state, where the processor detects a data packet identifying the group address at the network interface, and where the power management module returns the apparatus to the normal state upon detection of the data packet.

In a second aspect of the invention, a method includes determining to transition a network device to a sleep mode. A group address is stored in a register. The network device is placed in the sleep mode, and a data packet is detected at a network interface during the sleep mode, the data packet identifying the group address. The network device is returned to a normal mode in response to the detection of the data packet.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
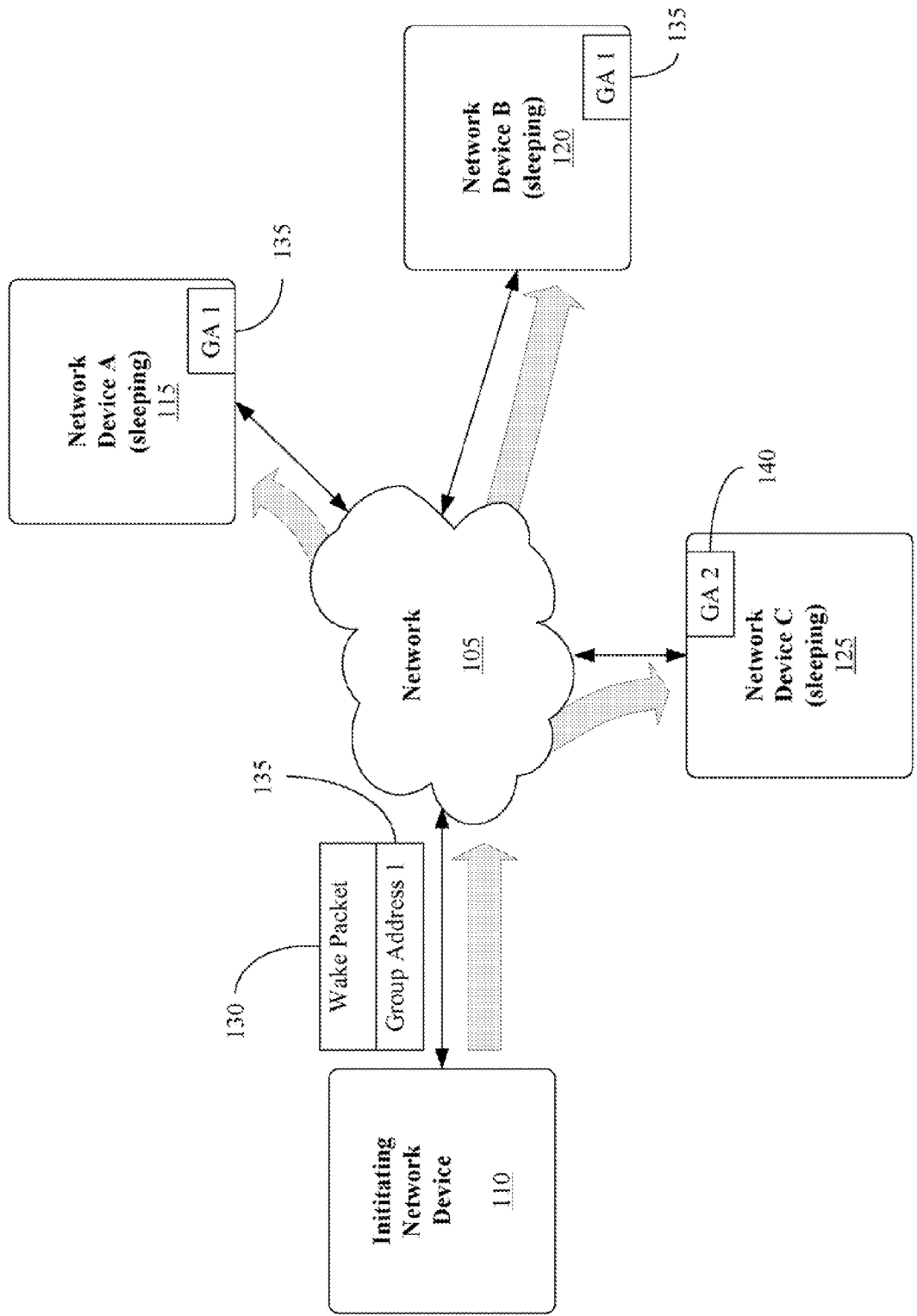
FIG. 1 is an illustration of an embodiment of a network providing for group power management.

Embodiments of the invention are generally directed to group power management of network devices.

As used herein, "entertainment network" means an interconnection network to deliver digital media content (including music, audio/video, gaming, photos, and others) between devices. An entertainment network may include a "personal entertainment network", such as a network in a household, an entertainment network in a business setting, or any other network of entertainment devices. In such a network, certain network devices may be the source of media content, such as a digital television tuner, cable set-top box, video storage server, and other source device. Other devices may display or use media content, such as a digital television, home theater system, audio system, gaming system, and other devices. Further, certain devices may be intended to store or transfer media content, such as video and audio storage servers. Certain devices may perform multiple media functions. In some embodiments, the network devices may be co-located on a single local area network. In other embodiments, the network devices may span multiple network segments, such as through tunneling between local area networks. The entertainment network may include multiple data encoding and encryption processes.

In some embodiments, a process is provided for enabling the waking of a group of one or more network devices. In an embodiment, a process is provided for waking network devices anonymously without requiring direct addressing of packets to network devices. In some embodiments, a system provides for awakening of network devices when the addresses for such devices are unknown to a device initiating the wake up process.

In some embodiments, network technology, such as WoL technology, is expanded to enable anonymous or group wake up of network devices. In some embodiment, the technique is applicable for any anonymous communication for which packet detection is not possible or desirable.

Most modern network interfaces include support for WoL. When a network device enters a low-power state, a processor (which may be referred to herein as a "wake processor"), such as typically a PIC (Programmable Intelligent Computer, originally Programmable Interface Controller) processor, monitors the bit stream that is visible at the physical interface. When a Magic Packet pattern with the device's MAC (Media Access Control) address is observed, the wake processor interrupts the device and causes it to wake up and resume normal operation.

In some embodiments, an apparatus of a system enhances the network interface to support multiple MAC addresses, such as one address used for normal communication and one address used for WoL. In this implementation, the address used for WoL may be a multicast address that is well-known and shared by devices of a particular group. For example, a multicast MAC address can be assigned by the IANA (Internet Assigned Numbers Authority) for use when waking members of a particular category of devices. In some possible example, the category of devices may include media devices on a personal entertainment network, and thus a single MAC address may be used to address all devices in the personal entertainment network. Such an address may be referred to herein as a "wake MAC address". In some embodiments, the wake MAC address may be an address reserved for wakeup of devices in a personal entertainment network, such as the address 00-D0-BD-00-40-C8 in this description.

In some embodiments, when a device enters a slumber (or low power) mode, the device may take one of at least two different approaches with regard to addressing. In a first embodiment, the device may replace the value of its MAC address (such as by setting a hardware register) with the reserved group MAC address. In this approach, when another device wishes to awaken all members of the group, the device broadcasts a Magic Packet that contains the group MAC address. Any slumbering device that is a member of the group will observe the packet and detect that the specified address matches its current MAC address and resume normal operation. Before resuming network communication, the device that has been awakened will replace its MAC address with its normal device address. In this way, a remote device can awaken a collection of network devices by only knowing the single group address.

In a second embodiment, an enhancement is provided to the addressing process to support the wake up of network devices. Rather than changing the interface MAC address when entering and leaving the low-power state, both addresses may be used simultaneously. In some embodiments, the use of the addresses simultaneously allows a sleeping device to be awakened both by explicit request and by anonymous group request. Similarly, during normal communication, group packets could also be exchanged simultaneously and over the same interface as unicast packets, i.e. a multi-homing network interface with group communication support.

In some embodiments, a network wake up mechanism may be implemented with limited changes to current network interfaces. In some embodiments, a network wake up mechanism is implemented without any changes being made at the device that initiates the wake up request other than a change in the address to be used for the wake up.

FIG. 1 is an illustration of an embodiment of a network providing for group power management. In this illustration, a network 105 includes multiple devices, including, for example, three devices that are in a sleep state, network device A 115, network device B 120, and network device C 125. Also attached to such network 105 is an initiating network device that may, for example, require services from the network devices and wishes to discover such devices. However, the initiating device 110 may not know the location of services or the MAC addresses of any individual device.

In some embodiments, the initiating network device provides a wake packet 130 (such as a Magic Packet) to the network 105 for delivery to the devices on the network. In some embodiments, the wake packet 130 includes a first group address (Group Address 1) 135 that may be intended for multiple devices. In this illustration, network device A 115 and network device B 120 include group address 1 (GA1 135). However, network device C 135 includes a separate group address, which in this instance is a group address 2 (GA2 140). In other embodiments, a single group address may be used for all devices in the network such that a single wake packet would wake all sleeping network devices.

In this illustration, network device A 115 and network device B 120 will recognize the address of the packet 130, and these devices will be awakened. Any number of devices in the network may be addressed in this same manner, eliminating the need for individually addressing the network devices. Further, in this illustration, network devices found in another group may be excluded, such as network device C 120, which includes group address 2 and will response to wake packets containing such address.

Figure 2:
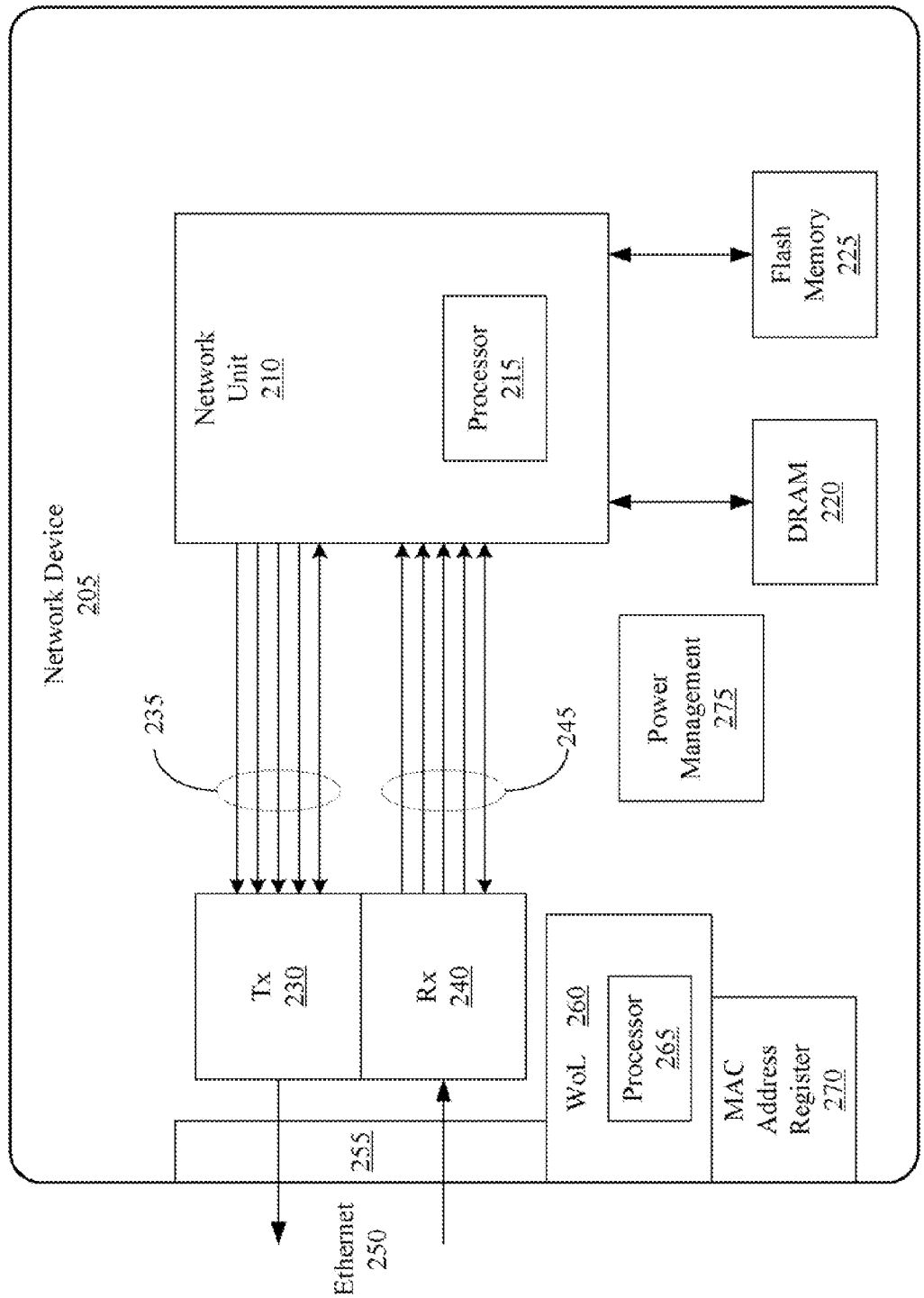
FIG. 2 is an illustration of an embodiment of components of a network device.

FIG. 2 is an illustration of an embodiment of components of a network device. In this illustration, a network device 205 may be any device in an entertainment network, including, but not limited to, devices illustrated in FIG. 4. For example, the network device may be a television, a set top box, a storage unit, a game console, personal computer, or other media device. In some embodiments, the network device 205 includes a network unit 210 to provide network functions. The network functions include, but are not limited to, the generation, transfer, storage, and reception of media data streams. The network unit 210 may be implemented as a single system on a chip (SoC) or as multiple components.

In some embodiments, the network unit 210 includes a processor for the processing of data. The processing of data may include the generation of media data streams, the manipulation of media data streams in transfer or storage, and the decrypting and decoding of media data streams for usage. The network device may also include memory to support network operations, such as DRAM (dynamic random access memory) 220 or other similar memory and flash memory 225 or other nonvolatile memory.

The network device 205 may also include a transmitter 230 or a receiver 240 (or both a transmitter and a receiver) for transmission of data on the network or the reception of data from the network, respectively, via one or more network interfaces 255. The transmitter 230 or receiver 240 may be connected to a wired transmission cable, including, for example, an Ethernet cable 250, or to a wireless unit. The transmitter 230 or receiver 240 may be coupled with one or more lines, such as lines 235 for data transmission and lines 245 for data reception, to the network unit 210 for data transfer and control signals. Additional connections that are not illustrated may also be present. The network device 205 also may include numerous components for media operation of the device, which are not illustrated here.

In some embodiments, the network device 205 may further include a module or element for remotely waking the network device, shown as wake on LAN (WoL) module 260. The WoL module 260 includes a low power processor 265. The network device 205 includes a power management module 275 that is operable to place the network device 205 in a sleep mode (a low power state in which elements are powered down or placed in a reduced state) or return the network device 205 to a normal mode from the sleep mode. (In some embodiments the WoL module 260 may be a part of the power management module 275, or the modules may be otherwise configured in the network device.) The processor 265 remains powered when the network device 205 is placed in the sleep mode, and the network process operates to detect packets on the network interface 255. The network device 205 further includes a MAC address register 270. In some embodiments, as a part of transitioning to a sleep state, the network device 205 operates to store a group address in the MAC address register 270. In some embodiments the group address is substituted for the MAC address for the network device 205 such that the processor 265 detects a wake packet that identifies an address for a group of network devices. In some embodiments, rather than substituting the MAC address, the group address is provided in addition to the MAC address for the network device 205 at any time such that the processor 265 detects a wake packet that is addressed to the network device 205 or that includes an address for a group of network devices, and, in some embodiments, may further utilize the group address in the normal mode.

Figure 3:
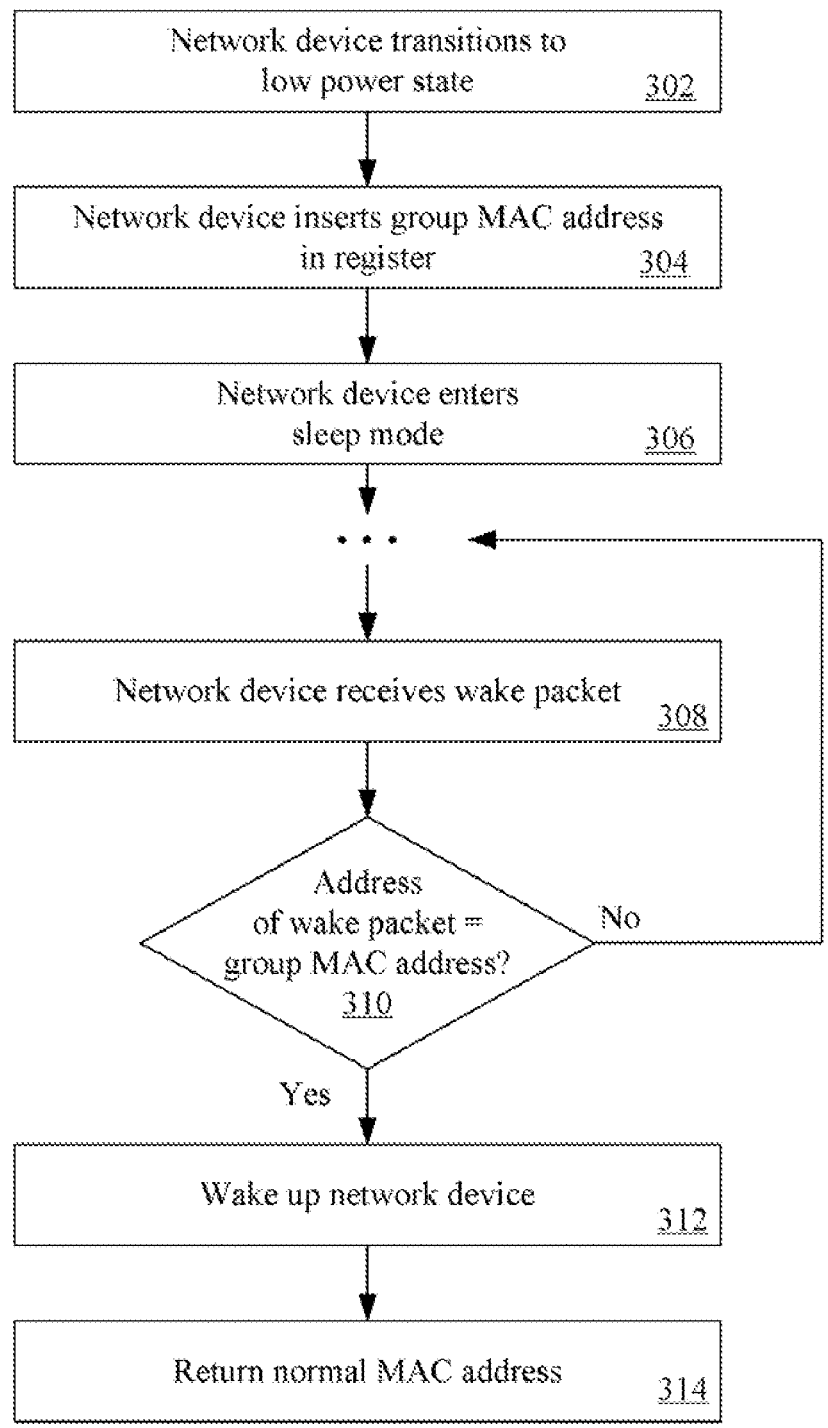
FIG. 3 is a flow chart to illustrate an embodiment of a process for group power management of network devices.

FIG. 3 is a flow chart to illustrate an embodiment of a process for group power management of network devices. In this illustration, a network device may transition to a low power state 302. In this transition, the network device may store a group MAC address in a register in addition to or in substitution for the MAC address of the network device 304. The network device then enters a sleep mode 306, with most elements of the network device being powered down or placed in a reduced power state during such sleep mode.

After some time period, the sleeping network device may receive a wake packet 308 (such as a Magic Packet), wherein the wake packet is detected by a wake on LAN module or element of the network device 308. In this process, the wake packet may not be addressed to the network device, but rather may identify an address for a group of network devices, which may include, for example, all attached network devices or any subset of such the attached network devices. If the address of the wake packet is the group MAC address that was stored in the register of the network device 310, then the wake on LAN system will operate to wake up the network device 312. (In some embodiments, a wake packet may alternatively identify the address of an intended network device that is currently in sleep mode, rather than the group MAC address, and the wake on LAN system will then also operate to wake up the network device.) The network device may then return the address to the normal MAC address of the network device 314, by removing the group MAC address from the register.

Figure 4:
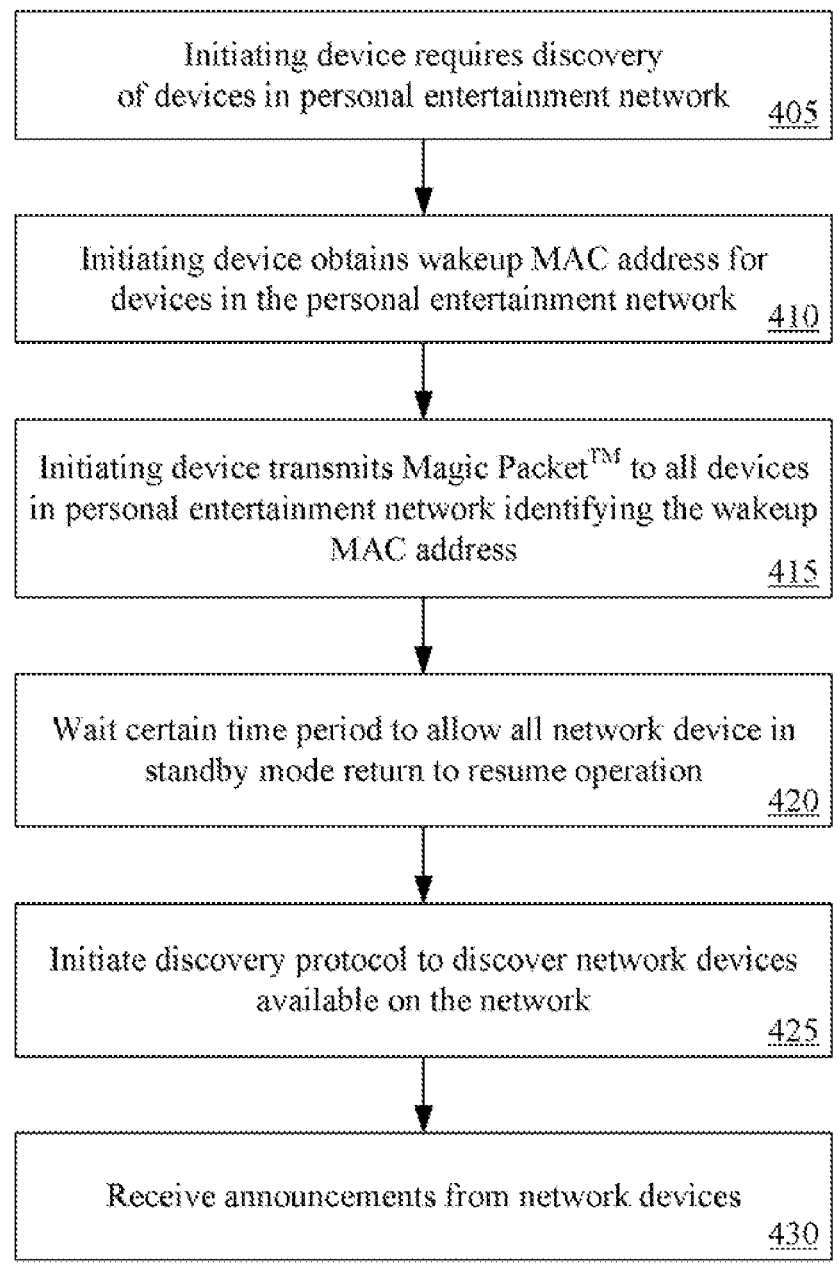
FIG. 4 is a flowchart to illustrate an embodiment of a process for wake up and solicitation of devices in a personal entertainment network.

FIG. 4 is a flowchart to illustrate an embodiment of a process for wake up and solicitation of devices in a personal entertainment network. In this illustration, an initiating device may require discovery of the network devices in a network such as, for example, a personal entertainment network 405. In one example, the initiating device may require services from such devices. However, one or more of the network devices may be in a sleep state, and the initiating devices may not be aware of the addresses for the sleeping devices. In some embodiments, the initiating device obtains a wakeup MAC address for all or a subset of the network devices in the network 410. In this example, it is assumed that the initiating device wishes to wake all devices in the network and the wake up MAC address is applicable for all such devices. The wakeup MAC address may be known to all devices in the network. The initiating device then transmits a Magic Packet to all of the devices in the network identifying the wakeup MAC address 415.

The initiating device then waits a certain time period to allow all network devices that are in standby mode to resume operations 420. After this time period has elapsed the initiating device may initiate the network discovery protocol to discover network devices and services available in the network 425, and may receive announcements from the network devices regarding their availability 430.

Figure 5:
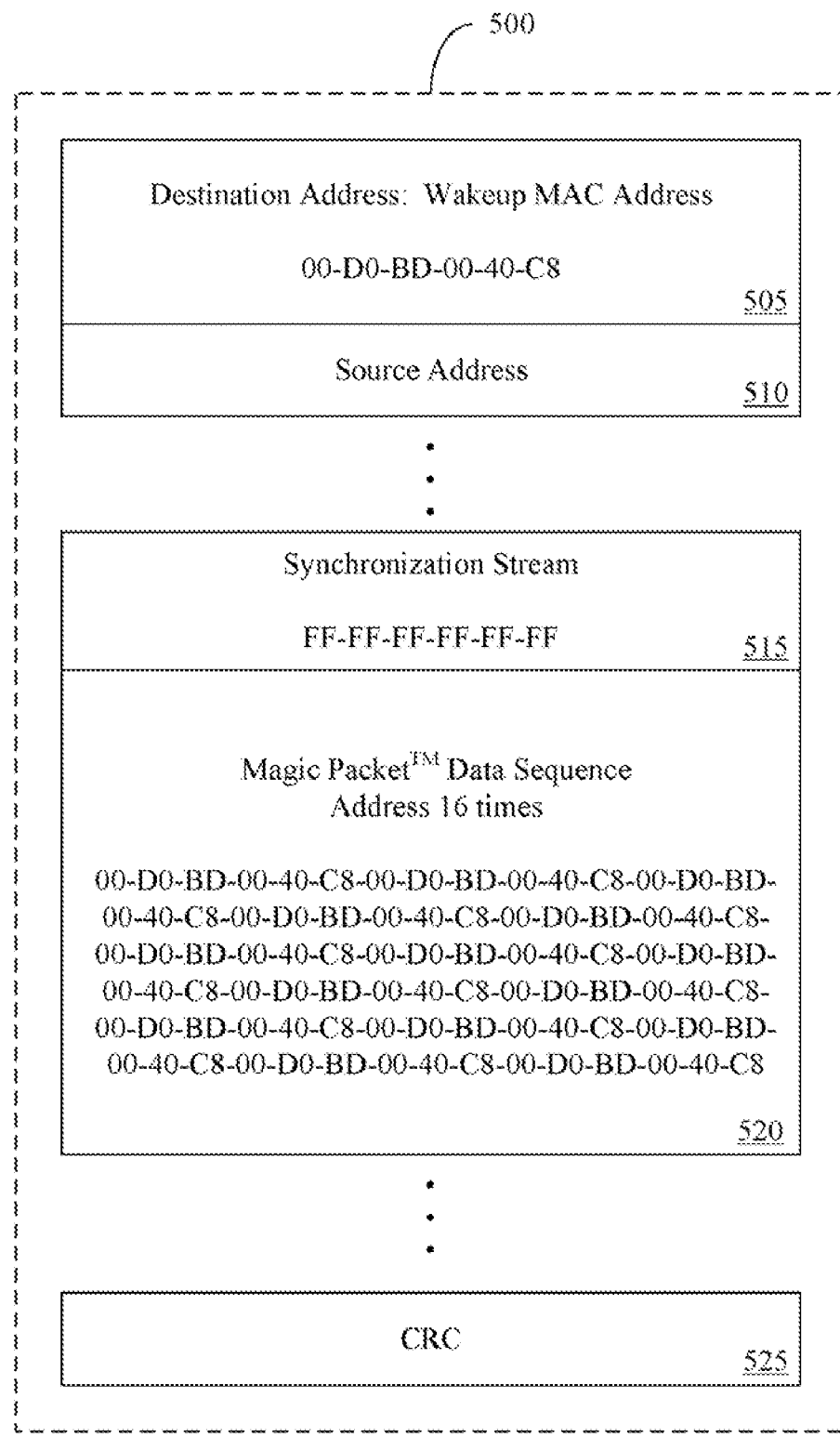
FIG. 5 is an illustration of a wake up packet utilized in an embodiment of the invention.

FIG. 5 is an illustration of a wake up packet utilized in an embodiment of the invention. This illustration of one possible form of a packet, such as in the form of a Magic Packet, but embodiments of the invention are not limited to any particular form of data packet. In this illustration, the packet 500 may include a destination address 505 and a source address 510 (such as the address of the initiating device). In some embodiments, the destination address 505 is an address for all devices in the network or some subset of the network. The packet 500 then may further include a synchronization stream (FF-FF-FF-FF-FF-FF in this example) to enable the receiving devices that are in sleep mode to synchronize on a wake up date sequence, shown here as a Magic Packet sequence composed of the wakeup MAC address repeated sixteen times 520. The packet 500 may include such other fields as are required, including fields such as a CRC (Cyclic Redundancy Check) sequence 525 for error detection requirements.

Figure 6:
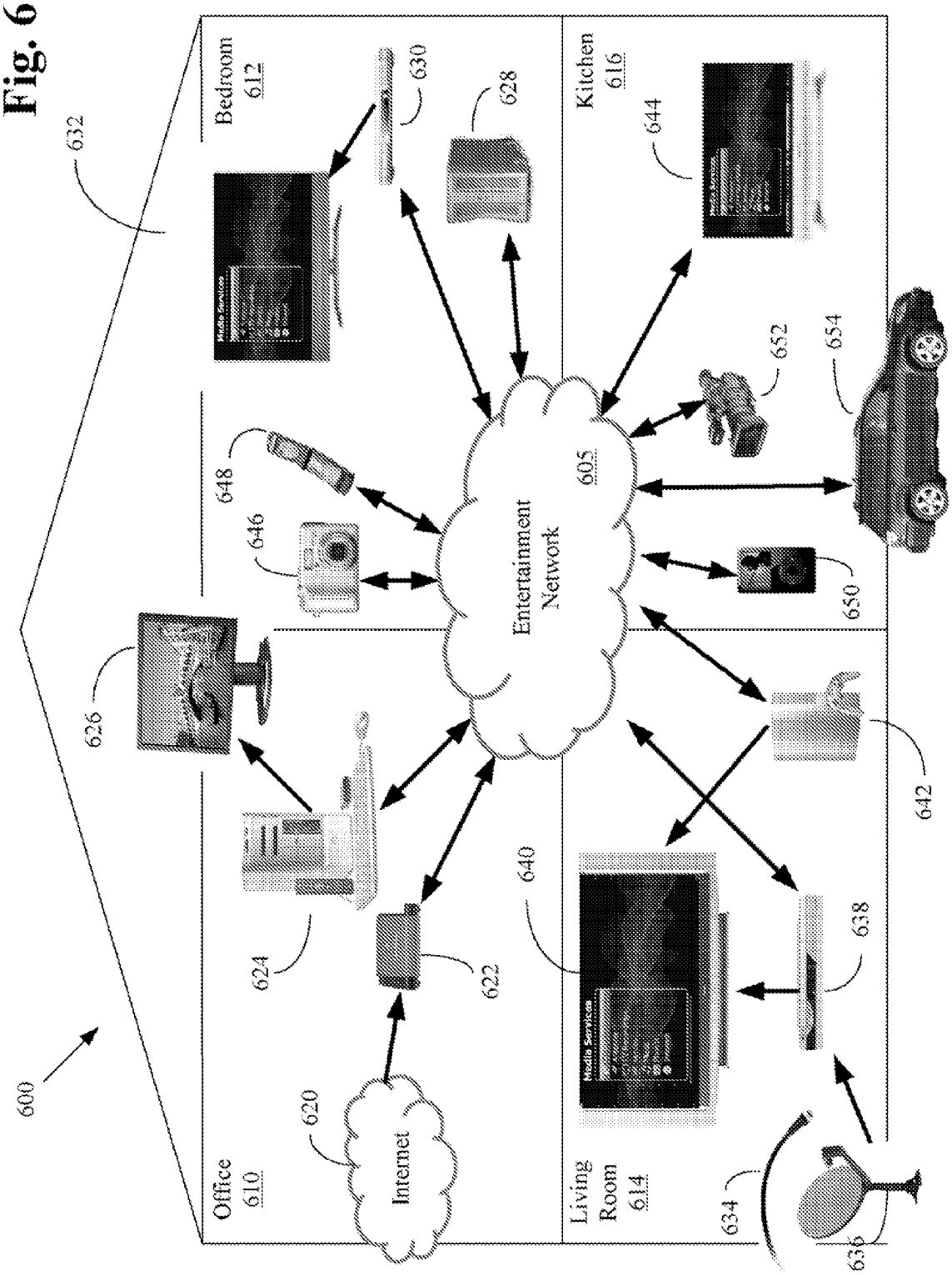
FIG. 6 is an illustration of embodiments of an entertainment network.

FIG. 6 is an illustration of embodiments of an entertainment network. In some embodiments, one or more of the network devices in the network 600 may transition to a sleep or low power state, such as when idle for a certain amount of time. In some embodiments, an initiating device in the network may send a wakeup message to the devices in the network, the message identifying a wakeup MAC address for all devices in the network or a subset of such devices to wake such devices up.

In this illustration, the entertainment network system 600 provides for the connection of any compatible media device to the network. The connection is shown as a connection to entertainment network 605. In some embodiments, the devices operate as network without a central network server. Through the entertainment network, media data streams may be transferred between any of the connected devices. In addition, devices may be controlled remotely through the network. The devices may be connected to the network via any known connector and connection protocol, including coaxial cables, Ethernet cables, and Firewire, and wireless connections via Wi-Fi, Bluetooth, and other wireless technologies.

In some embodiments, the devices may include any media sources or recipients. In FIG. 6, an office 610 may provide an Internet connection 620 via a modem 622 to the network 605. The data received from the Internet may include any streaming media sources, including, but not limited to, purchased audio files (such as downloaded music files), video files (such as movies, television, and other), and computer games. The office 610 may also be connected to a personal computer 624 that utilizes a monitor 626, which may, among other functions, display certain media streams or operate certain computer games.

The entertainment network may also be connected with devices in a bedroom 612, which may, for example, contain a set top box 630 to provide data to a television 632. In addition, the bedroom (or any other space) may contain a media storage unit 628. The media storage unit 628 may receive data from any source connected to the network 605, and may provide data to any data recipient connected to the network 605. The media storage unit 628 may contain any type of media stream data for the network.

The system may further include a living room 614 receiving, for example, input from a cable or fiber system 634 or from a satellite dish network 636. The media input from such sources may be provided to a set top box 638 connected to the network 605 and to a second television 640. Also connected to the network 605 for display on the living room television 640 may be a video game unit 642. There may be any number of other rooms with networked devices, such as a kitchen containing a third television 644 connected to the network 605. Other network devices may also be present, including, but not limited to, a stereo audio system that may include speakers placed throughout the house.

In addition, any number of mobile personal electronic devices may connect to the network. The devices may connect via a cable or via a wireless signal, including, but not limited to, Bluetooth, Wi-Fi, infrared, or other similar wireless communication protocols. Each such protocol may require an interface to the network (which are not shown in FIG. 6), such as a Wi-Fi base station. Such mobile personal electronic devices could include a digital camera 646, a cellular telephone 648, a personal music device 650, or a video camera 652. In addition, a mobile system contained in an automobile 654 may connect to the network 605 when the automobile is in close proximity to the network (such as when present in a garage of the house). The mobile personal electronic devices may, for example, automatically connect to the network when within range of the network. While connected, the devices may be available to obtain data through the network or to provide data to the network, including possible automatic updates or downloads to the devices. In one example, a user may be able to access the data contained in any of the mobile electronic devices through the network, such as accessing the photographs stored on the digital camera 646 on the living room television 640 via the set top box 638.

Figure 7:
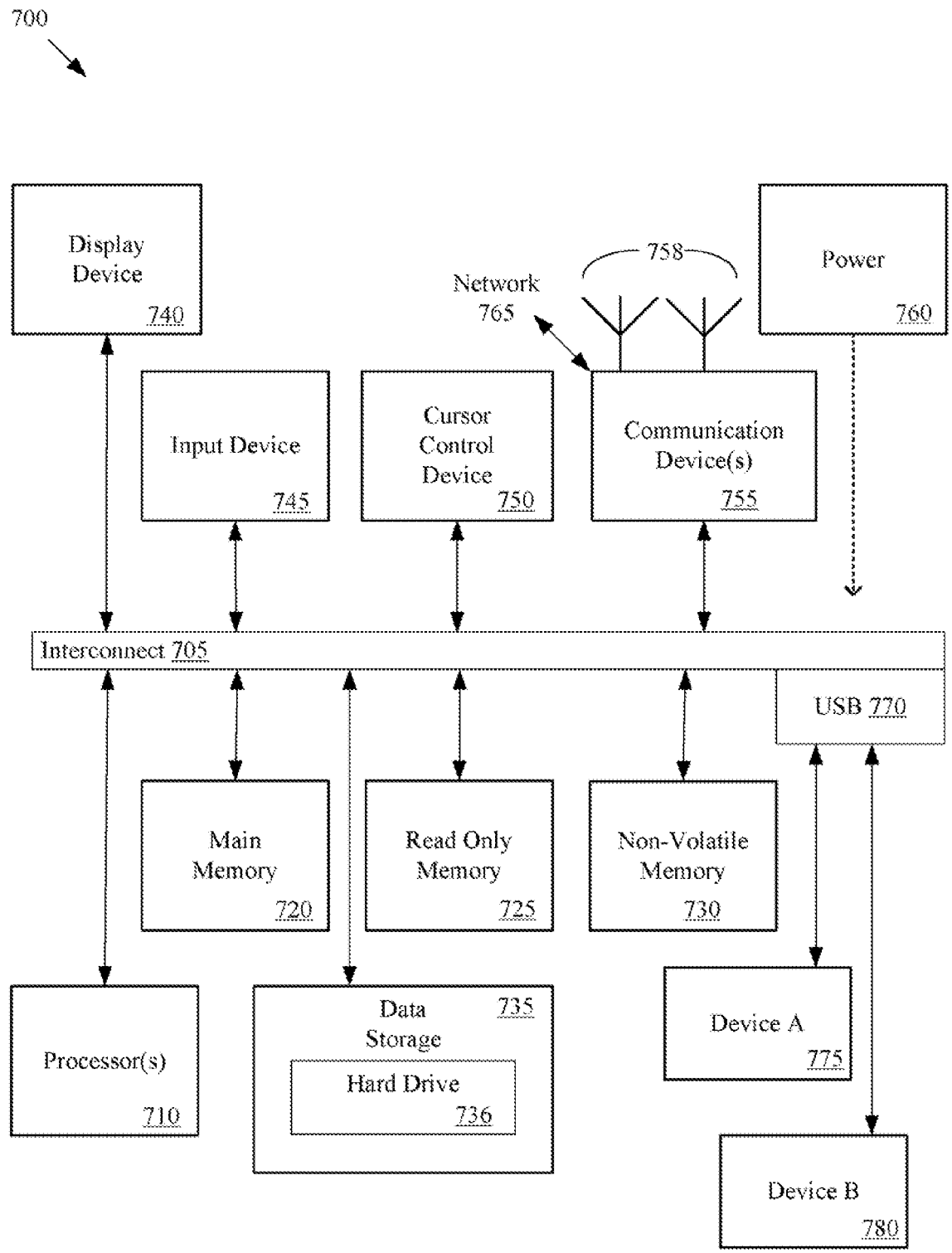
FIG. 7 is an illustration of a computing device that may be utilized in an embodiment of the invention.

FIG. 7 is an illustration of an embodiment of a computing device that may be utilized in an embodiment of the invention. In this illustration, certain standard and well known components that are not germane to the present description are not shown, and certain illustrated elements may not be contained in an embodiment of a network device. Under some embodiments, a computing device 700 may be either a transmitting device or a receiving device. In some embodiments, the computing device 700 may be a device that initiates a wake up sequence to wake up other devices in the network, or the computing device may be a device that enters a low power state and is awakened by a wakeup message received from the initiating device.

Under some embodiments, the device 700 comprises an interconnect or crossbar 705 or other communication means for communicating information, which may include high speed data transport. The device 700 further includes a processing means such as one or more processors 710 coupled with the interconnect 705 for processing information. The processors 710 may comprise one or more physical processors and one or more logical processors. Further, each of the processors 710 may include multiple processor cores. In some embodiments, the processors may include a processor that is capable of monitoring the network for a wakeup message when the computing device 700 is in a low power state. The interconnect 705 is illustrated as a single interconnect for simplicity, but may represent multiple different interconnects or buses and the component connections to such interconnects may vary. The interconnect 705 shown in FIG. 7 is an abstraction that represents any one or more separate physical buses, point-to-point connections, or both connected by appropriate bridges, adapters, or controllers. The interconnect 705 may include, for example, a system bus, a PCI or PCIe bus, a HyperTransport or industry standard architecture (ISA) bus, a small computer system interface (SCSI) bus, a IIC (I2C) bus, or an Institute of Electrical and Electronics Engineers (IEEE) standard 1394 bus, sometimes referred to as "Firewire". ("Standard for a High Performance Serial Bus" 1394-1995, IEEE, published Aug. 30, 1996, and supplements) The device 700 further may include a serial bus, such as USB bus 770, to which may be attached one or more USB compatible devices, such as device A 775 and device B 780.

In some embodiments, the processors 710 may be utilized to support one or more virtual machines. In some embodiments, the device 700 further comprises a random access memory (RAM) or other dynamic storage device as a main memory 720 for storing information and instructions to be executed by the processors 710. Main memory 720 also may be used for storing temporary variables or other intermediate information during execution of instructions by the processors 710. RAM memory includes dynamic random access memory (DRAM), which requires refreshing of memory contents, and static random access memory (SRAM), which does not require refreshing contents, but at increased cost. DRAM memory may include synchronous dynamic random access memory (SDRAM), which includes a clock signal to control signals, and extended data-out dynamic random access memory (EDO DRAM). In some embodiments, memory of the system may include a shared memory, such as a shared BIOS/OS memory, that is accessible by multiple agents in the device. The device 700 also may comprise a read only memory (ROM) 725 or other static storage device for storing static information and instructions for the processors 710. The device 700 may include one or more non-volatile memory devices 730 for the storage of certain elements, including, but not limited to, system BIOS and one or more pre-OS applications.

Data storage 735 may also be coupled to the interconnect 705 of the device 700 for storing information and instructions. The data storage 735 may include a magnetic disk, an optical disc and its corresponding drive, or other memory device. Such elements may be combined together or may be separate components, and utilize parts of other elements of the device 700. In a particular embodiment, the data storage 735 may include a hard drive 736.

The device 700 may also be coupled via the bus 705 to a display 740, such as a cathode ray tube (CRT) display, a liquid crystal display (LCD), a plasma display, or any other display technology, for displaying information to an end user. In some embodiments, the display 740 may be utilized to display television programming. In some environments, the display 740 may include a touch screen that is also utilized as at least a part of an input device. In some environments, the display 740 may be or may include an audio device, such as a speaker for providing audio information, including the audio portion of a television program. An input device 745 may be coupled to the interconnect 705 for communicating information and/or command selections to the processors 710. In various implementations, the input device 745 may be a keyboard, a keypad, a touch screen and stylus, a voice-activated system, or other input device, or combinations of such devices. Another type of user input device that may be included is a cursor control device 750, such as a mouse, a trackball, or cursor direction keys for communicating direction information and command selections to the one or more processors 710 and for controlling cursor movement on the display 740.

One or more communication elements 755 may also be coupled to the interconnect 705. Depending upon the particular implementation, the communication elements 755 may include a transceiver, a wireless modem, a network interface card, LAN (Local Area Network) on motherboard, or other interface device. The communication elements 755 may provide a connection to a network 765 to transmit network data, such as Ethernet data. The uses of a communication device 755 may include reception of signals from wireless devices. For radio communications, the communication device 755 may include one or more antennas 758, including any dipole or monopole antennas, as required. In one embodiment, the communication elements 755 may include a firewall to protect the device 700 from improper access. The device 700 may also comprise a power device or system 760, which may comprise a power supply, a battery, a solar cell, a fuel cell, or other system or device for providing or generating power. The power provided by the power device or system 760 may be distributed as required to elements of the device 700.

In the description above, for the purposes of explanation, numerous specific details are set forth in order to provide a thorough understanding of the present invention. It will be apparent, however, to one skilled in the art that the present invention may be practiced without some of these specific details. In other instances, well known structures and devices are shown in block diagram form. There may be intermediate structure between illustrated components. The components described or illustrated herein may have additional inputs or outputs which are not illustrated or described.

The present invention may include various processes. The processes of the present invention may be performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

Portions of the present invention may be provided as a computer program product, which may include a computer-readable medium having stored thereon computer program instructions to be executed by a processor, which instructions may be used to program a computer (or other electronic devices) to perform a process according to the present invention. The computer-readable medium may be floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of tangible media/computer-readable medium suitable for storing electronic instructions.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example of the invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. An apparatus comprising:
 a power management module, the power management module configured to transition the apparatus from a normal state to a low power state;
 a wake module, the wake module including a processor configured to remain active in the low power state;
 a register of the apparatus to store a group address, wherein the power management module is configured to store the group address in the register as a part of a transition from the normal state to the low power state, and wherein the power management module storing the group address in the register comprises the power management module storing the group address as a replacement for a MAC (Media Access Control) address of the apparatus; and network interface, the network interface to be monitored by the processor in the low power state;

wherein the processor is to detect a data packet identifying the group address at the network interface, and wherein the power management module is to transition the apparatus back to the normal state upon detection of the data packet, the power management module being configured to remove the group address from the register of the apparatus as a part of the transition of the apparatus back from the low power state to the normal state.

2. The apparatus of claim 1, wherein the wake module includes a Wake on LAN (WoL) module.

3. The apparatus of claim 1, wherein the data packet is a Magic Packet™.

4. The apparatus of claim 1, wherein the processor is a state machine processor.

5. The apparatus of claim 1, wherein the apparatus is a media device in an entertainment network.

6. The apparatus of claim 1, wherein the apparatus is one of a plurality of network devices on a network, and wherein the group address is designated for all of the network devices in the network or for a subset of the network devices on the network.

7. A method comprising:
determining to transition a network device from a normal mode to a sleep mode;
transitioning the network device to the sleep mode, wherein transitioning the network device from the normal mode to the sleep mode includes storing a group address in a register of the network device, and wherein storing the group address in the register of the network device includes replacing a MAC (Media Access Control) address of the network device with the group address when the sleep mode is initiated;
detecting a data packet at a network interface during the sleep mode, the data packet identifying the group address;
returning the network device to the normal mode in response to the detection of the data packet;
removing the group address from the register of the network device as a part of the return of the network device from the sleep mode back to the normal mode; and
replacing the removed group address in the register of the network device with the MAC address of the network device when the normal mode is initiated.

8. The method of claim 7, wherein the data packet does not include the MAC address of the network device.

9. The method of claim 7, wherein the data packet is a Magic Packet™.

10. A system comprising:
a plurality of network devices in a network, the plurality of network devices including:
a first network device in the network, the first network device to send a first wakeup message to other network devices of the plurality of network devices in the network, the wakeup message to include a group address;
wherein one or more of the plurality of network devices to transition from a normal state to a low power state under certain circumstances, each of the one or more network devices including a processor configured to monitor the network for wakeup messages while the one or more network devices are in the low power state, each of the one or more network devices including a register to store the group address and a power management module configured to store the group address in the register as a part of a transition from the normal state to the low power state, wherein the power management module storing the group address in the register comprises the power management module storing the group address as a replacement for a MAC (Media Access Control) address of the network device; and
wherein, upon detecting the wakeup message including the group address, each of the one or more network devices in the low power state to transition to the normal state, the power management module of each of the one or more network devices being configured to remove the group address from the register of the network device as a part of the transition of the network device from the low power state back to the normal state.

11. The system of claim 10, wherein the network is a personal entertainment network.

12. The system of claim 10, wherein the group address is designated for all of the network devices in the network.

13. The system of claim 10, wherein the group address is designated for a subset of the network devices in the network.

14. A non-transitory computer-readable medium having stored thereon data representing sequences of instructions that, when executed by a processor, cause the processor to perform operations comprising:
determining to transition a network device from a normal mode to a sleep mode;
transitioning the network device to the sleep mode, wherein transitioning the network device from the normal mode to the sleep mode includes storing a group address in a register of the network device, and wherein storing the group address in the register of the network device includes replacing a MAC (Media Access Control) address of the network device with the group address when the sleep mode is initiated;
detecting a data packet at a network interface during the sleep mode, the data packet identifying the group address;
returning the network device to the normal mode in response to the detection of the data packet;
removing the group address from the register of the network device as a part of the return of the network device from the sleep mode back to the normal mode; and
replacing the removed group address in the register of the network device with the MAC address of the network device when the normal mode is initiated.

* * * * *